US006961896B1

(12) United States Patent
Rousselle et al.

(10) Patent No.: US 6,961,896 B1
(45) Date of Patent: Nov. 1, 2005

(54) METHOD AND SYSTEM FOR SETTING DOCUMENT-LINKED TIMED REMINDERS

(75) Inventors: Allan Rousselle, Redmond, WA (US); Kevin Browne, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 849 days.

(21) Appl. No.: 09/728,197

(22) Filed: Nov. 30, 2000

(51) Int. Cl.[7] .............................................. G06F 17/00

(52) U.S. Cl. ............................. 715/500.1; 715/501.1; 715/512

(58) Field of Search ........................... 715/500, 500.1, 715/501.1, 512, 515

(56) References Cited

U.S. PATENT DOCUMENTS

| | | | | |
|---|---|---|---|---|
| 5,893,114 | A | * | 4/1999 | Hashimoto et al. ......... 707/200 |
| 5,995,951 | A | * | 11/1999 | Ferguson ...................... 706/10 |
| 6,240,429 | B1 | * | 5/2001 | Thornton et al. ........... 715/500 |
| 6,253,217 | B1 | * | 6/2001 | Dourish et al. ............. 715/500 |
| 6,331,866 | B1 | * | 12/2001 | Eisenberg ................... 345/784 |
| 6,457,017 | B2 | * | 9/2002 | Watkins et al. ......... 707/103 R |
| 6,562,076 | B2 | * | 5/2003 | Edwards et al. ............ 715/515 |
| 6,587,895 | B1 | * | 7/2003 | Golovchinsky et al. ....... 710/12 |
| 6,622,015 | B1 | * | 9/2003 | Himmel et al. .......... 455/414.1 |

OTHER PUBLICATIONS

Microsoft Office 97, Copyright 1983-1996, Selected screen shots as shown in Microsoft Office 97—Send To Functions pp. 1-11 captured Mar. 30, 2004.*

* cited by examiner

Primary Examiner—Stephen Hong
Assistant Examiner—Gregory J Vaughn
(74) Attorney, Agent, or Firm—Ronald M. Anderson

(57) ABSTRACT

A method and system for creating timed reminders linked to computer-readable documents. The present invention permits a user to create a reminder for any date and time, and associate any data file with the reminder in such a manner that the file is automatically opened, executed, or read as applicable at the date and time specified in the reminder. A document-linked reminder may be created from any application program within an application suite through the use of a reminder creation dialog. The reminder creation dialog permits a user to specify a time and date on which the reminder will activate, and an associated file. The reminder is then stored in a database. The reminder creation dialog may be later accessed in order to create additional reminders, or to edit the time, date, or associated file for existing reminders. Periodically, the document reminder system will poll the database in order to determine whether any reminders need to be activated. This polling is carried out via the application suite, when active, or via a background program if the application suite is inactive. At the time and date specified, the reminder will be displayed, along with the name of the associated file and a variety of reminder options. In an exemplary embodiment, these options include the ability to reschedule, delete, or delay the reminder, as well as the ability to launch or otherwise execute the associated file.

18 Claims, 5 Drawing Sheets

METHOD AND SYSTEM FOR SETTING DOCUMENT-LINKED TIMED REMINDERS

TECHNICAL FIELD

The present invention relates generally to the field of scheduling applications, and more specifically to the field of timed reminders associated with computer-readable files.

BACKGROUND

People have always jotted down notes to remind themselves of appointments or tasks. Unfortunately, these notes are often lost or misplaced, which leads to missed meetings or unfinished work. With the advent of computers, electronic reminder applications gained popularity. Several reminder applications display user-created notes or information in a timely and efficient manner, permitting a user to create and see a reminder without running the risk of losing a physical piece of paper. This convenient and efficient method for scheduling tasks allows a computer user to have complete confidence in his ability to create and view reminders for any situation, so long as he is able to access his computer.

However, these reminder applications are generally limited in scope. Many reminder applications are limited to simple text notes. That is, while several computer-executable applications may permit a user to create and schedule electronic reminders, they also limit the user to typing in a short note or other piece of information to serve as the reminder. Thus, in the case where a user wishes to resume editing a document at a later time, the user may create a reminder, but must then locate and open the document without any assistance from the reminder application. If the user has forgotten where the document is stored, this may lead to wasted time as the user attempts to locate the document or, in an extreme case, the inability to continue working if the document cannot be found.

To date, the inventors believe that the only applications which permit documents to be associated with a reminder are electronic mail programs, and then only in the case where the document is an electronic mail message. Thus, there is a need in the art for a means to schedule a reminder for a later date and time, and to associate a file with the reminder that may be accessed or otherwise manipulated when the reminder is activated.

Additionally, current reminder applications only function when the application itself is active on a computer. If the application is not running at the time the reminder is due to appear, then that reminder is delayed until the next time the application is active. This may also lead to missed appointments and delayed work. Therefore, there is a need in the art for a means to create computer-based reminders, and to retrieve these reminders regardless of whether the reminder application is active.

SUMMARY

The present invention is directed generally to a method and system for setting timed reminders linked to user documents. These timed reminders will open after a set period, permitting a user to see details regarding a flagged document, as well as offering various options to a user in connection with either the document or the reminder itself. The flagged document may be any type of file generated by the application suite, whose contents in turn may have embedded executable macro(s) attached.

A user may create a reminder from any application that is a part of an application suite. Typically, the reminder includes a time and date on which the user wishes to be reminded about a certain "flagged" file. The name of the file, along with the application associated with the file, is appended to the reminder. The reminder is stored in a shared database, which may be accessed by any application that is part of an overall application suite.

Presuming that an application is active, the database is periodically polled to determine whether any reminders must be displayed. Reminders are displayed when the current system time matches the time and date specified by the user when the reminder was created or last edited. If no application is active, a background program may be run for the sole purpose of performing systematic checks of the database.

When a reminder is displayed, a first reminder dialog appears on the user's display screen. This reminder dialog typically includes the time and date of the reminder, the name of the flagged file, the application associated with the flagged file, any notes added by the user, and buttons permitting the user to open the file, delay (or "snooze") the reminder, or delete the reminder. Additionally, a user may double-click the flagged document in order to access a second reminder dialog that displays any notes the user may have added to the reminder.

Clicking the "open" button on the first reminder dialog instructs the system to launch the flagged file using whatever application is associated with the flagged file. This may result in the launch of an application program not currently active. The user may additionally access reminders before the specified time and date to reschedule or delete a reminder. Further functionality permits the user to make a recurring reminder, which is activated at set intervals.

That the invention improves over the drawbacks of the prior art and accomplishes the above objectives may be seen upon reading the specification.

DETAILED DESCRIPTION

Generally speaking, the present invention is a method and system for creating timed reminders linked to computer-readable documents. More specifically, the present invention permits a user to create a reminder for any date and time, and associate any data file with the reminder in such a manner that the file is automatically opened, executed, or read as applicable at the date and time specified in the reminder. Although the term "document" and "document-linked reminder" are used throughout this specification, any computer-readable file may be used with the present invention. This includes, but is not limited to, data files, program executable files, HTML files, graphics files, and so on. Thus, it may be seen that the term "document" is used as convenient shorthand for any computer-readable file, rather than by means of restricting the present invention to word processor files.

A user may create a document-linked reminder from any application program that is a part of an application suite. Each program in the application suite typically has a hot button, menu item, link, or other means of initiating a reminder creation dialog. The reminder creation dialog permits a user to specify a time and date on which the reminder will activate, and an associated file. The reminder is then stored in a database. The reminder creation dialog may be later accessed in order to create additional reminders, or to edit the time, date, or associated file for existing reminders, or to remove the reminder.

Periodically, the document reminder system will poll the database in order to determine whether any reminders need to be activated. The document reminder system performs this task by polling the database during idle CPU cycles or as a background computing task. In the exemplary embodiment, this polling is typically carried out via at least one application within the application suite. Thus, an application comprising a portion of the suite must be active in order to poll the database for the presence of any imminent reminders. In the event that no portion of the application suite is active, the exemplary embodiment may launch a background program for the sole purpose of checking the database at set intervals for the presence of reminders whose time and date fields match the current time and date.

At the time and date specified, the reminder will be displayed, along with the name of the associated file and a variety of reminder options. In an exemplary embodiment, these options include the ability to reschedule, delete, or delay the reminder, as well as the ability to launch or otherwise execute the associated file.

Exemplary Operating Environment

Figure 1:
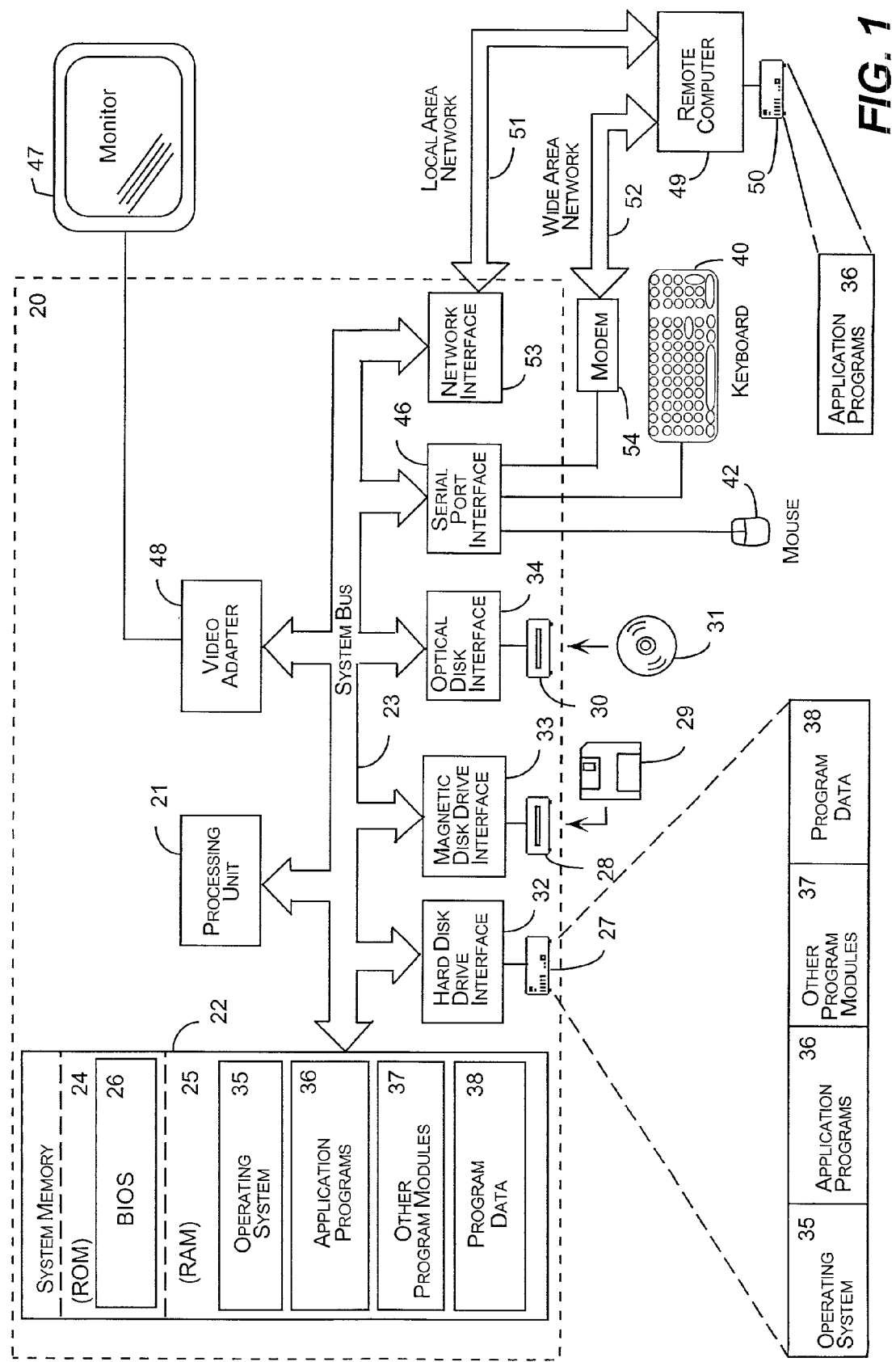
FIG. 1 depicts an exemplary operating environment for an exemplary embodiment of the present invention.

FIG. 1 and the following discussion are intended to provide a brief, general description of a suitable computing environment in which the invention may be implemented. While the invention will be described in the general context of application programs that run on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, BERNOULLI™ cartridges, and the like, may also be used in the exemplary operating environment.

A number of program modules 37 may be stored in the drives and RAM 25, including an operating system 35, a reminder database 210, a document reminder system 100, application programs 36, one or more dynamically linked libraries (not shown), and program data 38. A user may enter commands and information into the personal computer 20 through conventional input devices, including a keyboard 40 and pointing device, such as a mouse 42. Other input devices (not shown) may include a pen, touch-operated device, microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A display screen 47 or other type of display device is also connected to the system bus 23 via an interface, such as a video adapter 48. In addition to the display screen 47, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, application programs depicted relative to the personal computer 20, or portions thereof, may be stored in the remote memory storage device. It will be appreciated that the network connections shown are exemplary and other means of establishing a communications link between the computers may be used.

Description of an Exemplary Embodiment

Figure 2:
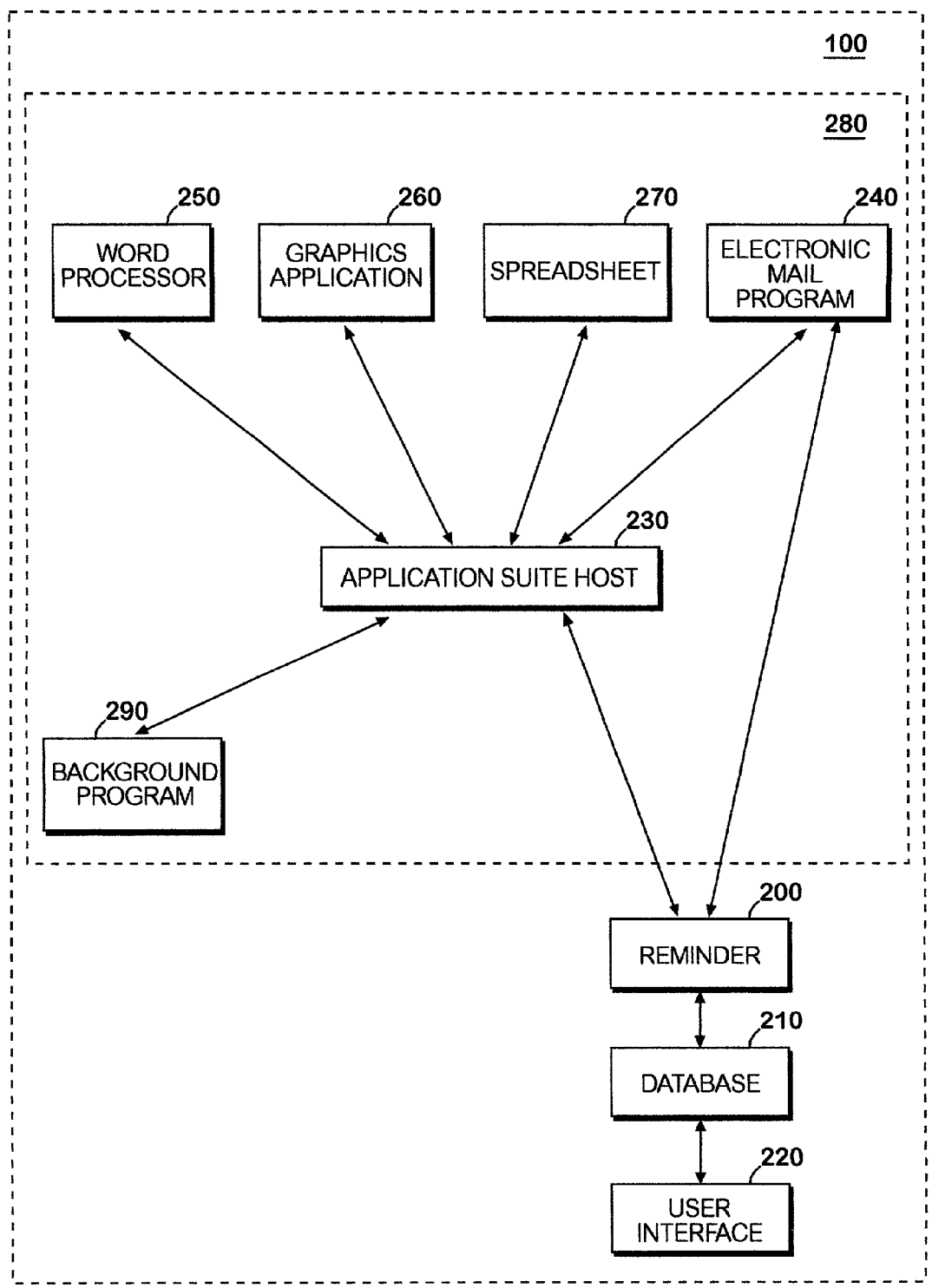
FIG. 2 depicts a block diagram of an exemplary embodiment of the present invention.

FIG. 2 displays a block diagram of an exemplary embodiment of the current invention. The document reminder system 100 consists of a database 210, an application suite 280, and a user interface 220. The database 210 stores any reminders 200 created by a user of the application suite 280. Thus, the database may be shared by any and all of the applications in the application suite.

A user may create a document-linked reminder 200 from any portion of the application suite 280. Each application within the application suite typically has a button, menu item, command, or other means to access a document-linked reminder creation dialog. The document-linked reminder creation dialog is discussed in greater detail with respect to FIG. 3. Thus, a user may access this dialog while working with a word processor 250, a drawing program 260, a spreadsheet program 270, or an email application 240. The document-linked reminder 200 contains a specified time and date on which the reminder is to appear. Additionally, the document-linked reminder contains an alias pointing to the associated document. In this manner, when the reminder reappears on the specified time and date, the document may also be accessed from the reminder 200 through the use of the alias. An "alias" is a shortcut or other means by which a computer-executable file may be accessed from a remote location or directory other than the directory in which the original document resides. The concept of accessing a document from within a document-linked reminder 200 is discussed in greater detail with respect to FIG. 4.

In the exemplary embodiment of the document reminder system 100, a user creating a document through any portion of the application suite 280 accesses exactly the same dialog, no matter which component application 240, 250, 260, 270 is employed to initiate creation of the document-linked reminder 200. From the user's perspective, creating a document-linked reminder 200 always follows the same process. However, depending on which application 240, 250, 260, 270 the user selects to create the document-linked reminder, the creation and storage of the reminder may be handled differently by the document reminder system 100. In the exemplary embodiment, most application suite 280 elements interface with the database 210 through an application suite host 230. The application suite host 230 is responsible for displaying the document-linked reminder creation dialog, creating the document-linked reminder 200, and generally providing an interface between an application 250, 260, 270 and the database 210. In the exemplary embodiment, the electronic mail messaging application 240 may communicate directly with the database 210, rather than employing the application suite host 230 as an intermediary, although this is done as a matter of convenience rather than necessity. Alternate embodiments may permit any or all portions of the application suite 280 to interface with the database 210 directly.

Once the document-linked reminder 200 is created and the time, date, and associated document are specified, the reminder is stored in the database 210. In an exemplary embodiment, the date and time at which the reminder is activated are stored in the database, along with the name of the associated document. In the exemplary embodiment, document-linked reminders 200 are stored and indexed through the use of a file system specification, or "FSSpec." The FSSpec keeps track of the volume on which the document is stored, as well as the document's exact location on that volume. As the document is moved (via saving the document in a new location, system cleanup activities, disk space reallocation, and so on), the FSSpec is updated to point to the document's new location. The FSSpec keeps track of the document's current location even if the document is moved from one folder or location to another. Alternate embodiments may employ various methods of tracking the document's location. For example, the document reminder system 100 may keep a running list of current file paths in accordance with the file designations for the active operating system 35.

Periodically, the document reminder system will poll the database in order to determine whether any reminders need to be activated. The document reminder system performs this task by polling the database during idle CPU cycles or as a background computing task. In the exemplary embodiment, this polling is typically carried out via at least one application within the application suite. Thus, an application comprising a portion of the suite must be active in order to poll the database for the presence of any imminent reminders. In the event that no portion of the application suite is active, the exemplary embodiment may launch a background program 290 for the sole purpose of checking the database at set intervals for the presence of reminders whose time and date fields match the current time and date.

Figure 5:
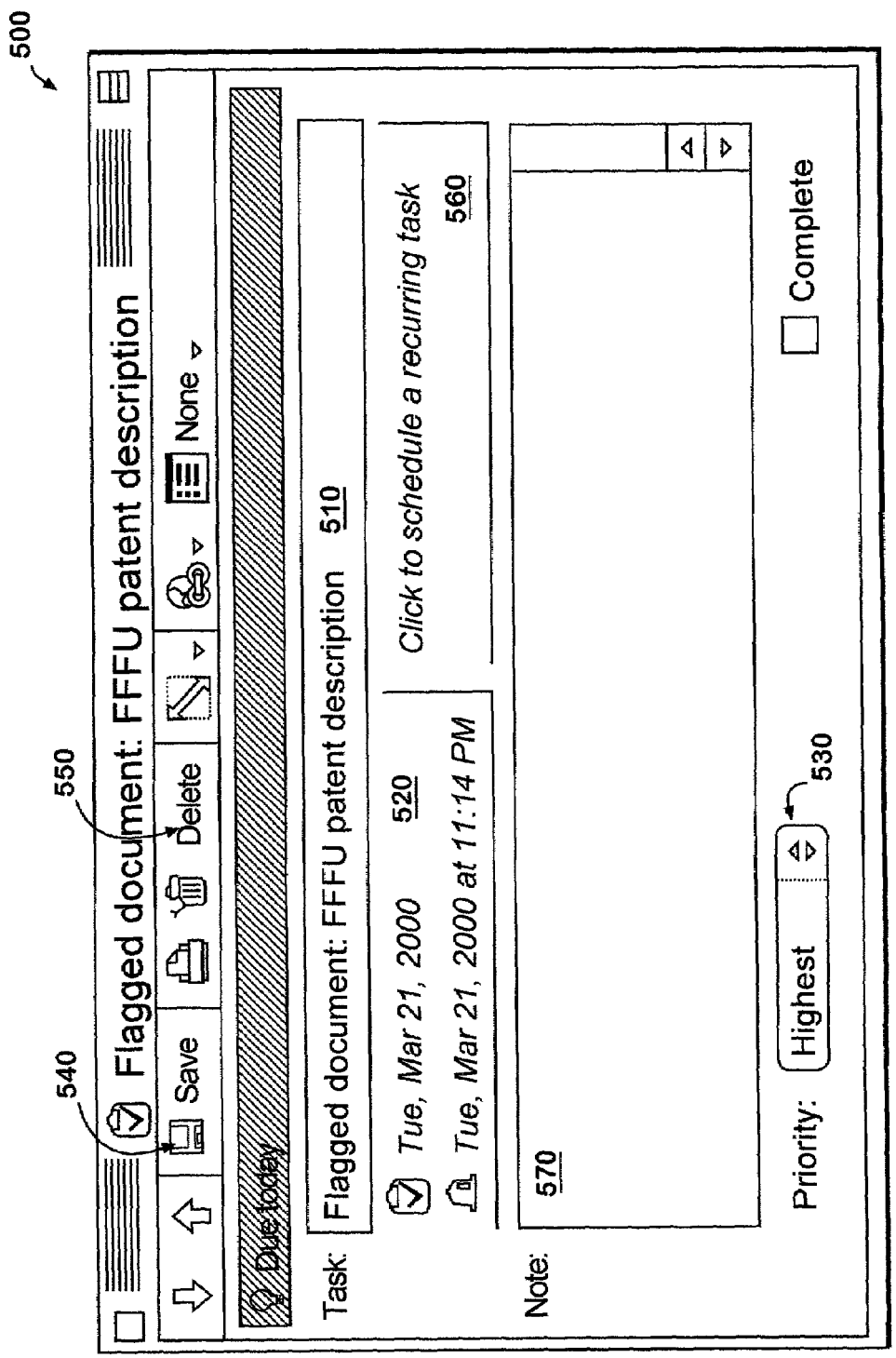
FIG. 5 depicts a screen display in accordance with an exemplary embodiment of the present invention.

An alternate embodiment of the document reminder system 100 may also include a user interface 220 which permits a user to directly manipulate reminders 200 present in the database 210, without going through the application suite 280. In an alternate embodiment, the user interface 220 may initiate either a document-linked reminder creation dialog, as shown in FIG. 3, or a document-linked reminder editing dialog, as shown in FIG. 5.

The Reminder Creation Dialog

Figure 3:
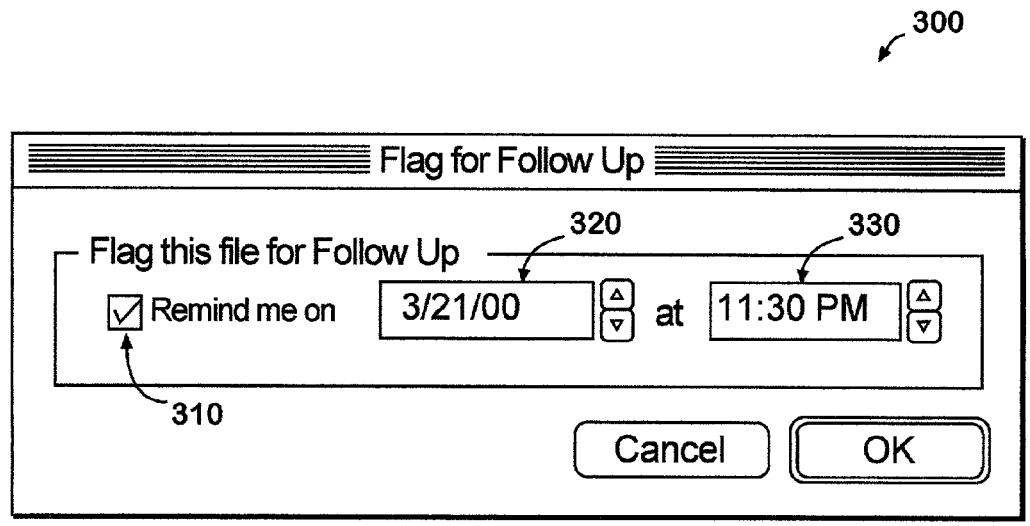
FIG. 3 depicts a screen display in accordance with an exemplary embodiment of the present invention.

FIG. 3 displays the reminder creation dialog 300. As previously mentioned, this dialog may be accessed either from any of the applications 240, 250, 260, 270 comprising the application suite 280, or from the user interface 220. The reminder creation dialog 300 is typically used to create a reminder 200 and store the reminder in the database 210 for later retrieval.

The reminder creation dialog 300 contains a checkbox 310, a date field 320, and a time field 330. A user may specify a time in the time field 330 and a date in the date field 320 at which he desires the reminder to be retrieved from the database 210 by the document reminder system 100 and displayed. Once these fields contain a value, the user may check the checkbox 310, which in turn sets the reminder 200 as "active." Only active reminders are retrieved and displayed. The reminder 200 is automatically associated with whichever document is currently displayed in the application 240, 250, 260, 270 used to create the reminder. The user may subsequently invoke the reminder creation dialog 300 and clear the check box, which results in removing the reminder from the database.

The Reminder Dialog

Figure 4:
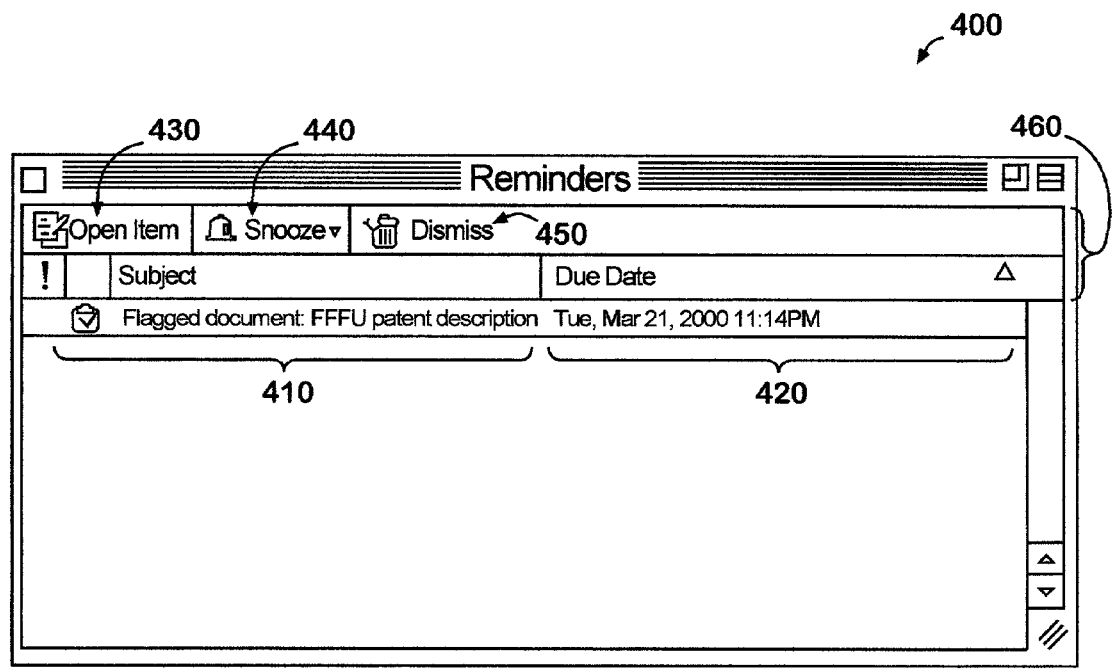
FIG. 4 depicts a screen display in accordance with an exemplary embodiment of the present invention.

When the document reminder system 100 detects that the date 320 and time 330 fields of a reminder 200 stored in the database 210 match the current date and time, the system retrieves the reminder and displays a reminder dialog 400. An example of the reminder dialog is shown in FIG. 4.

Generally speaking, the reminder dialog 400 consists of a toolbar 460, a subject field 410, and a due date field 420. The time and date entered in the time field 330 and the date field 320 of the reminder creation dialog 300 are jointly displayed in the due date field 420. The name of the associated document is shown in the subject field 410. These two fields permit a user to quickly and easily identify the reason the reminder has been activated and the due date of the reminder.

The user may employ the toolbar 460 to perform a variety of operations on the reminder 200. For example, clicking the open item button 430 contained within the toolbar will launch whatever application is necessary to view the document listed in the subject field 410, if the application is not active. In the event that the document is itself an executable file, the document will be launched. In the further event that the document is not an executable file, and there is no known application to display the document, then document will remain dormant.

The snooze button 440 is also present on the toolbar 460 of the exemplary embodiment. Clicking the snooze button returns the reminder 200 to the database 210, and removes the displayed reminder from sight. After a fixed interval, the reminder 200 will again be retrieved from the database and displayed. This fixed interval may vary between embodiments. Alternately, the user may also choose the length of time until the reminder is redisplayed. In the exemplary embodiment, the user may select a custom interval via a drop-down menu (not shown).

The final portion of the exemplary embodiment's toolbar 460 is the dismiss button 450. Clicking the dismiss button 450 may delete the reminder 200 from the database 210 and remove the reminder from display. Alternately, if the reminder 200 is tied to a second display, such as a calendar entry, the reminder itself may remain in the database 210 so long as the calendar entry is active. Whether or not the reminder 200 is actually deleted, clicking the dismiss button 450 ensures that the reminder 200 will not be redisplayed at a later time.

The Edit Reminder Dialog

A user may also edit previously created reminders 200. In order to do so, a user of the exemplary embodiment accesses the reminder editing dialog 500, shown in FIG. 5. The reminder editing dialog 500 may be accessed either from the user interface 220, or from any portion of the application suite 280. Additionally, an exemplary embodiment may permit a user to access the edit reminder dialog by double-clicking on the subject field 410 of the reminder dialog 400.

The reminder editing dialog 500 displays the name of the associated document in the task field 510. From the reminder editing dialog 500, the user may alter the reminder 200 in a number of ways. First, the user may delete the reminder by clicking on the delete button 550. Second, the user may add a note to the reminder by typing in the note field 570. Any notes added will be displayed the next time the reminder 200 is opened in the reminder editing dialog 500. Third, the user may schedule the reminder 200 as a recurring reminder by clicking the recurring task field 560. Designating a reminder 200 as a recurring task instructs the document reminder system 100 to display the reminder at recurring intervals, as specified by the user. Fourth, the user may designate a priority for the reminder 200 by selecting a priority level from a drop-down menu 530. Finally, a user may alter the time and/or date for displaying the reminder 200 by entering a new time and/or date in the time/date display field 520. Once a user has completed editing the reminder 200, he may choose to save the reminder by clicking the save button 540, or to delete the reminder by clicking the delete button 550.

Alternate embodiments may permit additional functionality to be accessed from the reminder editing dialog 500. An alternate embodiment may permit a reminder to initiate an action other than simply opening a document. For example, a reminder may initiate actions such as publishing data to a webpage periodically. Presume that a user wishes to update a spreadsheet every Friday. So long as a data source may be accessed by the reminder 200, an "auto-updating" reminder may not only open the associated document, but initiate a preset number of changes to the document to reflect weekly changes in underlying data, and then publish the changed data to a web page.

Logical Operation of an Exemplary Embodiment

Figure 6:
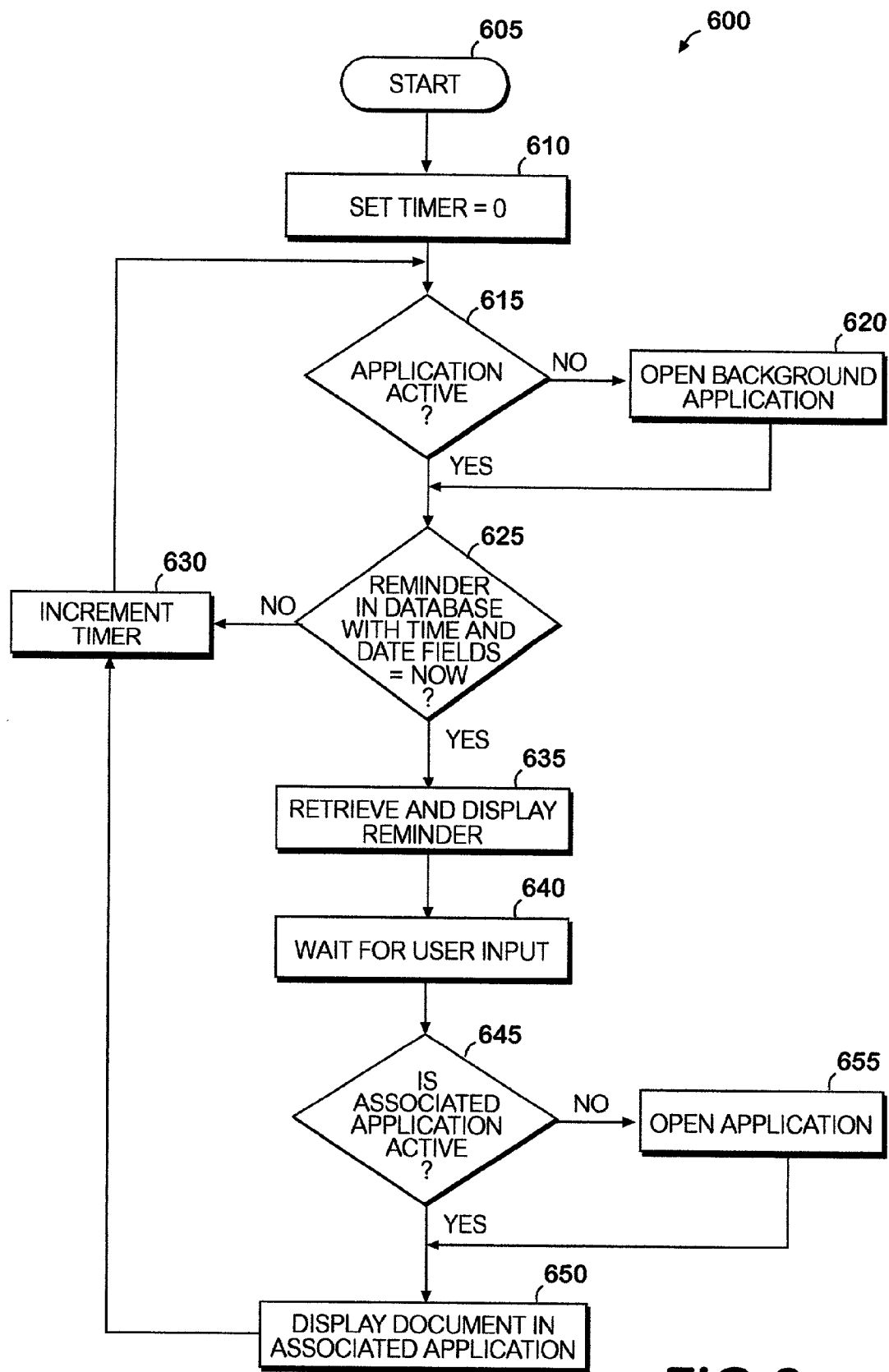
FIG. 6 depicts a logic flow diagram displaying the operation of an exemplary embodiment of the present invention.

FIG. 6 displays a flowchart of the steps required to monitor the database 210, retrieve any current reminders 200, and display any associated documents. The routine 600 shown in FIG. 6 is performed by an exemplary embodiment of the present invention. The routine 600 begins in "start" step 605, where the logic routine is initiated. Following step 605, step 610 is accessed, wherein a timer is set to zero.

After step 610, the document reminder system 100 executes decision step 615. In step 615, the system 100 must determine whether any application 240, 250, 260, 270 is currently active which may poll the database 210. If such an application is active, then step 625 is accessed. Otherwise, step 620 is initiated, in which the system 100 launches a background program 290. The background program is solely dedicated to polling the database 210 and executing steps 625 through 650, as detailed below.

In step 625, the document reminder system 100 employs either an active application 240, 250, 260, 270 or the background program 290 to determine whether a reminder exists in the database 210 wherein the entries in the time field 330 and date field 320 match the current date and time. If not, then step 630 is accessed. If so, then step 635 is executed.

In step 630, the document reminder system 100 increments the timer before returning to decision step 615. The timer increment may vary in size from one embodiment to another. Generally speaking, the timer is incremented by the smallest amount permitted by the personal computer 20 on which the document reminder system 100 is running.

The document reminder system 100 executes step 635 following a positive determination in step 625. In this step, the reminder 200 is retrieved from the database 210 and displayed on the display screen 47. The system then proceeds to step 640, wherein the system 100 awaits a user input indicating that the associated document should be retrieved. Once the user input is received by the system, decision step 645 is accessed.

In step 645, the document reminder system 100 must determine whether the application 240, 250, 260, 270 necessary to display the document associated with the reminder 200 is already active or not. In the event that the application is not running, step 655 is executed and the necessary application is opened. After step 655, step 650 is accessed. If the required application 240, 250, 260, 270 is active, then the system 100 skips step 655 and proceeds directly to step 650. In step 650, the document is displayed in the appropriate application. Following step 650, the timer is incremented in step 630 and the reminder determination loop of steps 615 through 655 is repeated.

CONCLUSION

The document reminder system 100 may include additional functionality not herein specifically described. For example, the system may allow a user to schedule a recurring reminder directly from the reminder creation dialog 300, rather than from the reminder editing dialog 500. Many other modifications and additional features will become evident in view of the preceding description of the embodiments of the invention. It should be understood, therefore, that the foregoing relates only to certain embodiments of the invention, and that numerous changes may be made therein without departing from the spirit and scope of the invention as defined by the following claims.

We claim:

1. A method for creating a timed reminder linked to a document, comprising the steps of:
   opening a document in an application program;
   indicating that the document is to be accessed at a later date;

in response to indicating that the document is to be accessed at a later date, from within one of an application suite comprising the application program and a user interface, creating a reminder having a date field, a time field, and a document field, creation of the reminder occurring in a seamless manner without requiring a user to manually access a different application program in order to create the reminder;

the step of creating the reminder comprising the step of enabling a user to:
set a date in the date field for accessing the document;
enter a time in the time field for accessing the document; and
set the name of the document in the document field; and
storing the reminder in a shared database that supports timed reminders linked to documents associated with a plurality of application programs.

2. The method of claim 1, wherein the document is a word processor compatible file.

3. The method of claim 1, wherein the document is a spreadsheet.

4. The method of claim 1, wherein the document is a graphical file.

5. The method of claim 1, wherein the document is a computer-executable file other than an electronic mail message.

6. The method of claim 1, wherein the application program is chosen from the group consisting of a word processor, a spreadsheet application, and a graphics application.

7. The method of claim 6, wherein the document is of a type not associated with the application program.

8. The method of claim 1, further comprising the steps of:
at the date and time specified in the date field and time field, retrieving the reminder from the database; and
displaying the reminder along with the name of the associated document.

9. A computer-readable medium storing instructions which, when executed, perform the steps of claim 8.

10. A method for displaying a document associated with a scheduled reminder, comprising the steps of:
automatically determining whether an application capable of polling a database is active, and if so;
automatically polling the database from a first application;
determining whether a reminder is present in the database with a time field matching the current time and a date field matching the current date;
in response to determining that a reminder is present in the database with a time field matching the current time and a date field matching the current date, retrieving the reminder;
displaying the reminder on a display screen;
retrieving a document associated with the reminder; and
displaying the associated document in a second application.

11. The method of claim 10, further comprising the steps of:
in the event that an application capable of polling the database is not active, automatically activating a background program dedicated to polling the database; and
setting the background program as the active application.

12. The method of claim 11, further comprising the steps of:
determining that the associated document is incompatible with the active application;
in response to determining that the associated document is incompatible with the second application, activating a third application capable of displaying the associated document; and
displaying the associated document in the third application.

13. A computer-readable medium storing instructions which, when executed, perform the steps of claim 12.

14. The method of claim 12, further comprising the steps of:
determining that the reminder has been designated as auto-updating;
in response to determining that the reminder has been designated as auto-updating, initiating a series of changes to the document;
storing the document;
incrementing the time field and date field of the reminder by a set amount; and
storing the incremented reminder in the database.

15. The method of claim 12, further comprising the steps of:
determining that the associated document is a hyperlink to a web page; and
displaying the web page in a web browser.

16. A computer-implemented method for providing a timed reminder and associated file to a user, comprising the steps of:
creating a timed reminder having a time entry and date entry;
adding an associated file name to the timed reminder;
storing the timed reminder in a shared database;
automatically determining whether a checking application is active without intervention by a user;
in response to determining that a checking application is active, periodically comparing the current time and date with the time entry and the date entry;
in the event that the current time and date match the time entry and date entry, retrieving the timed reminder; and
displaying the timed reminder and the associated file name on a display screen;
otherwise, automatically activating a background checking program without intervention by the user;
periodically comparing the current time and date with the time entry and the date entry;
in the event that the current time and date match the time entry and date entry, retrieving the timed reminder; and
displaying the timed reminder and the associated file name on a display screen.

17. A computer-readable medium storing instructions which, when executed, performs the steps of claim 16.

18. The method of claim 16, wherein the shared database supports timed reminders linked to documents associated with a plurality of application programs and may be accessed by more than one application.

* * * * *